United States Patent [19]

Kavchok

[11] 3,928,296

[45] Dec. 23, 1975

[54] STABILIZATION OF VINYLIDENE CHLORIDE/DIENE COPOLYMERS

[75] Inventor: Ronald W. Kavchok, Massillon, Ohio

[73] Assignee: The Goodyear Tire & Rubber Company, Akron, Ohio

[22] Filed: Feb. 25, 1974

[21] Appl. No.: 445,362

[52] U.S. Cl. ................... 260/80.73; 260/45.9 NC
[51] Int. Cl.² ............................................. C08G 6/00
[58] Field of Search ..... 260/80.73, 29.7 N, 45.9 NC

[56] References Cited
UNITED STATES PATENTS

| | | | |
|---|---|---|---|
| 2,215,379 | 9/1940 | Sebrell | 260/79.5 B |
| 3,325,435 | 6/1967 | Gibbs | 260/80.73 |
| 3,658,769 | 4/1972 | Kline | 260/45.9 NC |
| 3,767,628 | 10/1973 | Kline | 260/80.73 |

*Primary Examiner*—V. P. Hoke
*Attorney, Agent, or Firm*—F. W. Brunner; J. A. Rozmajzl

[57] ABSTRACT

Flame retardant diene/vinylidene chloride copolymers are susceptible to high temperature degradation. This susceptibility is reduced significantly by using as a comonomer with the diene and the vinylidene chloride either N-(4-anilinophenyl) acrylamide or N-(4-anilinophenyl) methacrylamide.

7 Claims, No Drawings

STABILIZATION OF VINYLIDENE CHLORIDE/DIENE COPOLYMERS

This invention relates to flame retardant vinylidene chloride (VDC)/diene copolymers with improved heat age resistance. More particularly this invention relates to VDC/diene copolymers containing an acrylamide antioxidant chemically bound thereto.

VDC/diene copolymers are well known in the art, for example, see U.S. Pat. No. 2,215,379. VDC/diene copolymers (hereinafter referred to as VDC polymers) are known to be flame retardant. However, such polymers are extremely susceptible to degradation. In fact, so susceptible that they can not even be vulcanized at high temperatures without degradation occurring. Various stabilizers have been used in attempts to solve this problem but none have been successful. The stabilizer therefore that would prevent such degradation is highly desirable.

It is an object of the present invention to provide a flame retardant VDC polymer with improved heat age resistance. It is another object of this invention to provide a method of increasing the resistance to degradation of the VDC polymer at high temperatures, for example, during high temperature vulcanization and/or when the vulcanized polymer is exposed to high temperature aging. Other objects will become apparent as the description proceeds.

The objects of this invention are accomplished by polymerizing a monomer system comprising vinylidene chloride, a conjugated 1,3-diene monomer and an amide selected from the group consisting of N-(4-anilinophenyl) acrylamide and N-(4-anilinophenyl) methacrylamide. These compounds are part of the generic disclosure in U.S. Pat. No. 3,658,769. A disclosure of the preparation of the acrylamide is disclosed in Example 1 of U.S. Pat. No. 3,658,769. The methacrylamide can be prepared by substituting 11.5 grams of methacryloyl chloride for the acryloyl chloride.

These polymers are prepared by using conventional free radical emulsion polymerization techniques as described in U.S. Pat. No. 3,658,769. The disclosures of said patent are incorporated herein by reference.

The diene monomers are represented by 1,3-butadiene, isoprene and 2,3-dimethyl-1,3-butadiene.

The monomer system is comprised of at least 40 parts (preferably at least 50 parts) by weight of conjugated 1,3-diene monomer; at least 20 parts (preferably at least 25 parts) by weight of vinylidene chloride; 0.5 to 10 parts by weight (preferably 1 to 5 parts) of the amide and 0 to 25 parts by weight (preferably 0 to 15 parts) of other monomer per 100 parts by weight of total monomer.

Preferably the conversion, i.e., percent of monomer polymerized, is at least 60 percent, most preferably 80 to 90 percent.

The composition of the resultant polymer is normally not identical with the monomer charge ratio. That is, the ratio of the bound form of the monomers (also referred to as segmeric units or repeat units or polymerized form of the monomer) will vary from the monomer charge ratios because of reactivity ratio considerations. As a guideline the amount of bound diene will normally be greater than the amount charged, e.g., at least about 45 parts by weight per 100 parts by weight of total polymer (preferably about 55 to about 80 parts). The amount of bound vinylidene chloride will be at least about 15 parts by weight (preferably about 20 to about 35 or 40 parts). The amount of bound amide will be about 0.3 to about 6 parts (preferably about 0.6 to 3 parts) and the amount of other bound monomer about 0 to about 30 parts (preferably 0 to about 15 parts).

The polymers have various uses. For example, they may be used as a sponge rug underlay and for foam applications such as auto and airplane seat cushions. They may also be used as neoprene replacements, e.g., in hoses, cable sheathing, gaskets and conveyor belts.

Sponge rug underlay is used beneath carpeting in an attempt to provide better resilience and feel and to add to the carpet life. There is a need for fire retardant carpeting. Therefore it is important that the sponge rug underlay be fire retardant. The polymers described herein have inherent flame retardance, are quite suitable in sponge rug underlay applications and can be used in other flame resistant applications.

The following example is intended to illustrate the preparation of the polymers of the present invention but is not intended to limit the present invention.

A polymer is prepared according to the following recipe.

Table I

| Ingredient | (Polymerization Recipe) Parts by Weight |
|---|---|
| Water | 200 |
| Potassium Stearate | 4.0 |
| Trisodium Phosphate | 0.22 |
| Sodium Sulfate | 0.11 |
| N-(4-anilinophenyl)-methacrylamide | 2.0 |
| t-Dodecyl Mercaptan | Variable (0.5 to 1.0 parts) |
| Vinylidene Chloride | 35 |
| Butadiene | 63 |
| Azodiisobutyronitrile | 0.5 |

Polymerization temperature - 125° F.
Shortstopped at about 80 percent conversion in about 10 hours.

The above polymerization results in a polymer having improved resistance to degradation.

A vinylidene chloride/butadiene polymer was stabilized with Thermolite 20 (a PVC stabilizer) and a phenolic stabilization system containing 2,5-ditert.amyl hydroquinone and the butylated reactor product of p-cresol and dicyclopentadiene. When an attempt was made to vulcanize the polymer at 340° F., discoloration and malodorous conditions resulted thereby indicating decomposition. The resultant polymer was unsuitable for use. A conventional sponge rubber underlay of butadiene/styrene copolymer was cured with no discoloration or objectionable odor at 340° F. However, the conventional SBR type rug underlay does not have the flame retardancy associated with vinylidene chloride/butadiene copolymers.

A (65/35/1.6) 1,3-butadiene/vinylidene chloride/N-(4-anilinophenyl) methacrylamide copolymer latex was prepared and the latex coagulated. The dried polymer had an ML-4 (212°F.) of about 25. The polymer was compounded as follows.

| Compound | Parts by Weight |
|---|---|
| BD/Vinylidene Chloride/Amide Polymer | 100 |
| Zinc Oxide | 5 |
| Stearic Acid | 10 |
| Calcium Carbonate | 200 |

-continued

| Compound | Parts by Weight |
| --- | --- |
| Aluminum Hydrate | 100 |
| Processing Oil | 75 |
| Chlorinated Paraffinic Hydrocarbon Wax | 10 |
| Soya Epoxy PVC Stabilizer | 5 |
| Phenolic Antioxidant | 1 |
| Tricresyl Phosphate | 10 |
| Sodium Bicarbonate (Blowing Agent) | 10 |
| Oil Dispersed Form of Sodium Bicarbonate (Blowing Agent) | 18 |
| Zinc Dimethyldithiocarbamate | .35 |
| Tetramethylthiuram Disulfide | 2.0 |
| Sulfur | 4.5 |

The compounded polymer had an ML-4 (212° F.) of 4. A sponge was formed from the compounded rubber and vulcanized on a wire belt for 6 minutes at 340° F. The following data were obtained on the sponge.

| | |
| --- | --- |
| Compression-Deflection, 25% | — 3.6 pounds |
| Instron Grab Tear | — 7.0 pounds |
| Compression Set B, Aged 22 hours at 158° F., 50% Deflection | — 30 percent |
| 180° Bend, Aged 70 hours at 158° F. | — O.K. |
| Lab Tunnel Flame Spread Rating | — 48 |
| Pill Test | — O.K. |

There was no odor or visual evidence of any decomposition during the vulcanization process.

The monomers other than the conjugated 1,3-diene monomer, the vinylidene chloride and amide that can be included in the monomer system are preferably non-diene monomers and include acrylic monomers such as acrylic acids and esters thereof, e.g., methyl acrylate, methyl methacrylate, ethyl acrylate, acrylic acid, methacrylic acid and acrylonitrile as well as vinyl monomers such as styrene.

It should be noted that although the free amides are taught to be effective stabilizers against oxidation, they do not offer adequate protection in the present type of polymer.

It should be noted that in the previous working examples illustrating the practice of the present invention, N-(4-anilinophenyl) acrylamide could have been substituted for the methacrylamide to provide an effectively stabilized polymer. Likewise other dienes such as 2,3-dimethyl-1,3-butadiene or isoprene could have been substituted for the 1,3-butadiene. Also additional monomer could have been used, e.g., styrene or acrylonitrile.

The presence of the amide in the polymer helps to delay development of color in the polymer. It is normally desirable to also use a vinyl stabilizer such as dibutyl tin mercaptide and/or soya epoxy PVC stabilizer.

While certain representative embodiments and details have been shown for the purpose of illustrating the invention, it will be apparent to those skilled in this art that various changes and modifications may be made therein without departing from the spirit or scope of the invention.

I claim:

1. A process of preparing a heat stable conjugated 1,3-diene/vinylidene chloride polymer comprising polymerizing in a free radical, emulsion polymerization system a monomer system comprising at least 40 parts by weight of conjugated 1,3-diene monomer selected from the group consisting of 1,3-butadiene, isoprene and 2,3-dimethyl-1,3-butadiene; at least 20 parts by weight of vinylidene chloride; 0.5 to 10 parts by weight of an amide stabilizer and 0 to 25 parts by weight of other non-diene monomer per 100 parts by weight of total monomer, wherein the amide stabilizer is selected from the group consisting of N-(4-anilinophenyl) acrylamide and N-(4-anilinophenyl) methacrylamide.

2. The heat stable conjugated 1,3-diene/vinylidene chloride polymer prepared according to the process of claim 1.

3. A heat stable polymer having a bound conjugated 1,3-diene content of at least 45 parts, the diene being selected from the group consisting of 1,3-butadiene, isoprene and 2,3-dimethyl-1,3-butadiene, a bound vinylidene chloride content of at least 15 parts, a bound amide content of 0.3 part to 6 parts and a bound monomer content of 0 to 30 parts of other non-diene monomer, all parts being by weight per 100 parts by weight of total polymer and the monomeric form of the bound amide being selected from the group consisting of N-(4-anilinophenyl)acrylamide and N-(4-anilinophenyl)-methacrylamide.

4. The heat stable polymer of claim 3 wherein the non-diene monomer is selected from the group consisting of acrylic monomers and vinyl monomers.

5. The heat stable polymer according to claim 3 wherein the non-diene monomer is selected from the group consisting of methyl acrylate, methyl methacrylate, ethyl acrylate, acrylic acid, methacrylic acid, acrylonitrile, and styrene.

6. A polymer according to claim 3 wherein the polymer contains 55 to 80 parts of bound conjugated 1,3-diene, 20 to 40 parts of bound vinylidene chloride, 0.6 to 3 parts of the bound amide and 0 to 15 parts of the other bound monomer.

7. The polymer according to claim 6 wherein the amide is N-(4-anilinophenyl)methacrylamide.

* * * * *